United States Patent
Jira et al.

(10) Patent No.: US 10,966,145 B2
(45) Date of Patent: Mar. 30, 2021

(54) METHODS AND DEVICES FOR SMALL CELL SEARCH

(71) Applicant: Intel IP Corporation, Santa Clara, CA (US)

(72) Inventors: Frank Jira, Nuremberg (DE); Kumaran Subramanian, Oberasbach (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/328,744

(22) PCT Filed: Aug. 16, 2017

(86) PCT No.: PCT/US2017/047047
§ 371 (c)(1),
(2) Date: Feb. 27, 2019

(87) PCT Pub. No.: WO2018/063547
PCT Pub. Date: Apr. 5, 2018

(65) Prior Publication Data
US 2019/0215763 A1    Jul. 11, 2019

(30) Foreign Application Priority Data
Sep. 30, 2016    (EP) .................................... 16191752

(51) Int. Cl.
*H04W 48/16*    (2009.01)
*H04W 84/04*    (2009.01)
(Continued)

(52) U.S. Cl.
CPC ........... *H04W 48/16* (2013.01); *H04W 16/32* (2013.01); *H04W 24/02* (2013.01); *H04W 24/10* (2013.01);
(Continued)

(58) Field of Classification Search
None
See application file for complete search history.

(56) References Cited

U.S. PATENT DOCUMENTS 8,532,652 B1    9/2013    Edara
9,008,720 B2    4/2015    Yu et al.
(Continued)

FOREIGN PATENT DOCUMENTS

EP          2928244 A1       10/2015
WO     2011011792 A1        1/2011
(Continued)

OTHER PUBLICATIONS

Nokia Siemens Networks et al., "Enhancements for Small Cell Detection", 7.10.3, XP050565426, retrieved on Jan. 31, 2012, 12 pages, 3GPP TSG-RAN WG2 Meeting #77.
(Continued)

*Primary Examiner* — Chi H Pham
*Assistant Examiner* — Raul Rivas
(74) *Attorney, Agent, or Firm* — Viering, Jentschura & Partner MBB (57) ABSTRACT

Methods and devices adapted to receive a data in order to trigger a small cell search, including receiving a data from a network, wherein the data comprises at least one of: a small cell station location list comprising one or more small cell station locations, or a macro cell list comprising one or more macro cells, wherein the one or more macro cells have at least one small cell within their coverage; and triggering the small cell search at the device in response to at least one of the following: when the device is in proximity to a small cell station location listed in the small cell station location list, or when the device is within coverage of a macro cell listed in the macro cell list. These methods and devices may be configured to provide a mobile device with a method to
(Continued)

search for and select a closed subscriber (CSG) cell for the first time.

22 Claims, 4 Drawing Sheets

(51) Int. Cl.
*H04W 24/02* (2009.01)
*H04W 16/32* (2009.01)
*H04W 24/10* (2009.01)
*H04W 48/10* (2009.01)
*H04W 64/00* (2009.01)

(52) U.S. Cl.
CPC ......... *H04W 48/10* (2013.01); *H04W 64/003* (2013.01); *H04W 84/045* (2013.01)

(56) References Cited

U.S. PATENT DOCUMENTS

| | | |
|---|---|---|
| 2010/0323633 A1 | 12/2010 | Pani et al. |
| 2011/0105123 A1 | 5/2011 | Lee et al. |
| 2012/0263145 A1 | 10/2012 | Marinier et al. |
| 2013/0017820 A1 | 1/2013 | Drazynski et al. |
| 2013/0077507 A1 | 3/2013 | Yu et al. |
| 2013/0079049 A1* | 3/2013 | Yu .................. H04W 48/16 455/524 |
| 2015/0079972 A1 | 3/2015 | Drazynski et al. |
| 2015/0085771 A1* | 3/2015 | Pedersen ............ H04W 72/082 370/329 |
| 2016/0198439 A1* | 7/2016 | Dalsgaard ............ H04L 5/0098 370/329 |

FOREIGN PATENT DOCUMENTS

| | | |
|---|---|---|
| WO | 2013020522 A1 | 2/2013 |
| WO | 2014057101 A1 | 4/2014 |

OTHER PUBLICATIONS

3GPP, Technical Specificaion Group Core Network and Terminals; Characteristics of the Hosting Party Subscription Identity Module (HPSIM) application, 3rd Generation Partnership Project, TS 31.104, Mar. 2015, 22 pages, V12.1.0.

3GPP, Technical Specificaion Group Radio Access Network; Evolved Universal Terrestrial Radio Access (E-UTRA); User Equipment (UE) procedures in idle mode, 3rd Generation Partnership Project, TS 36.304, Jun. 2015, 38 pages, v12.5.0.

3GPP, Technical Specificaion Group Radio Access Network; User Equipment (UE) procedures in idle mode and procedures for cell reselection in connected mode, 3rd Generation Partnership Project, TS 25.304, Jun. 2015, 58 pages, v12.6.0.

3GPP, Technical Specificaion Group core Network and Terminals; Universal Subscriber Identity Module (USIM) Application Toolkit (USAT), 3rd Generation Partnership Project, TA 31.111, Jul. 2015, 137 pages, V13.0.0.

Partial European search report received for European patent Application No. 16191752.1, dated Mar. 17, 2017, 9 pages (Reference Purpose Only).

Extended European search report received for European patent Application No. 16191752.1, dated Jun. 6, 2017, 15 pages (Reference Purpose Only).

International search report received for PCT Application No. PCT/US2017/047047, dated Nov. 15, 2017, 15 pages (Reference Purpose Only).

* cited by examiner

METHODS AND DEVICES FOR SMALL CELL SEARCH

CROSS-REFERENCE TO RELATED APPLICATIONS

This application is a national stage entry according to 35 U.S.C. § 371 of PCT Application No. PCT/US2017/047047 filed on Aug. 16, 2017, which claims priority to European Patent Application Serial No. 16 191 752.1 filed on Sep. 30, 2016, both of which are incorporated herein by reference in their entirety.

TECHNICAL FIELD

Various aspects relate generally to methods and devices for wireless communications.

BACKGROUND

Closed Subscriber Group (CSG) frequencies and CSG cells are typically not broadcast by a Macro Cell's system information as a neighbor frequency or cell to be measured for a user equipment's (UE's) idle mode mobility. In current implementations, CSG cells need to be explicitly searched via Manual CSG search across all of the frequency bands used by the operator and supported by the UE and manually selected for the first time. Furthermore, the Autonomous search is not specified by the Third Generation Partnership Project (3GPP) and is left for UE implementation. Current Autonomous search implementations require the UE to have been camped on the CSG cell and the CSG cell maintaining the same CSG parameters in order to trigger the Autonomous search. Consecutive inbound mobility to a previously visited CSG cell is performed by an Autonomous CSG search using the fingerprints taken at the time while selecting and camping on the CSG cell.

A CSG cell is accessible only for a limited set of UEs. In order to prevent a UE from attempting to camp on a CSG cell which it does not have access, the UE maintains a CSG whitelist. The CSG whitelist is provided by the non-access stratum (NAS) and contains all the Identities of the CSGs, i.e. allowed or member CSG cells, to which the subscriber belongs and is allowed access. When reselecting to a CSG cell, the UE compares the CSG Identity of the detected CSG cell with its whitelist to check whether the detected CSG cell belongs to its group.

Operators and mobile phone vendors do not provide a user interface to either select a CSG Identity (i.e. CSG ID) from all available CSG IDs (i.e., manual CSG selection is not possible but a user can trigger a CSG search) or trigger a manual CSG search in order to perform a manual CSG selection (i.e., user does not have the option to specifically trigger the Manual CSG search and cannot select a CSG ID from the available CSG IDs). These restrictions introduce the need for UEs to perform a background search to detect and select a member CSG for the first time or select previously known CSG cells whose parameters are modified so they are no longer detectable through the Autonomous CSG search.

A background search can be implemented in several ways, for example, searching for a CSG cell once every time the UE is powered on or airplane mode is turned off or searching for a CSG periodically (e.g. every night, or every hour, or with variable periodicity).

However, such a background search presents several drawbacks. The UE's power may be compromised in order to reduce the time to detect and re-select an available CSG cell. Similarly, the time to detect and re-reselect an available CSG cell may be compromised in order to conserve power. Also, requiring the user to go through a power off/on or Airplane mode on/off sequence will break the user's internet protocol (IP) connection and interrupt pageability. In sum, these searches compromise user experience by draining power, interrupting mobile services, or the CSG selection does not happen when the user expects it to happen.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

The following detailed description refers to the accompanying drawings that show, by way of illustration, specific details and aspects in which the invention may be practiced.

The word "exemplary" is used herein to mean "serving as an example, instance, or illustration". Any aspect or design described herein as "exemplary" is not necessarily to be construed as preferred or advantageous over other aspects or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The terms "user equipment (UE)", "mobile terminal", "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station" used in reference to an access point of a mobile communication network may be understood as a macro base station, micro base station, Node B, evolved NodeB (eNB), Home eNodeB (HeNB), Home NodeB (HNB), Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section).

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

The term "idle mode" or "idle state" used herein in reference to a mobile terminal refers to a radio control state in which the mobile terminal is not allocated at least one dedicated communication channel of a mobile communication network. The term "connected mode" or "connected state" used in reference to a UE refers to a radio control state in which the UE is allocated at least one dedicated communication channel of a mobile communication network.

The disclosure herein provides methods and devices for a network to provide a small cell location information to the UE which can be used to derive the UE's proximity to the small cell.

Figure 1:
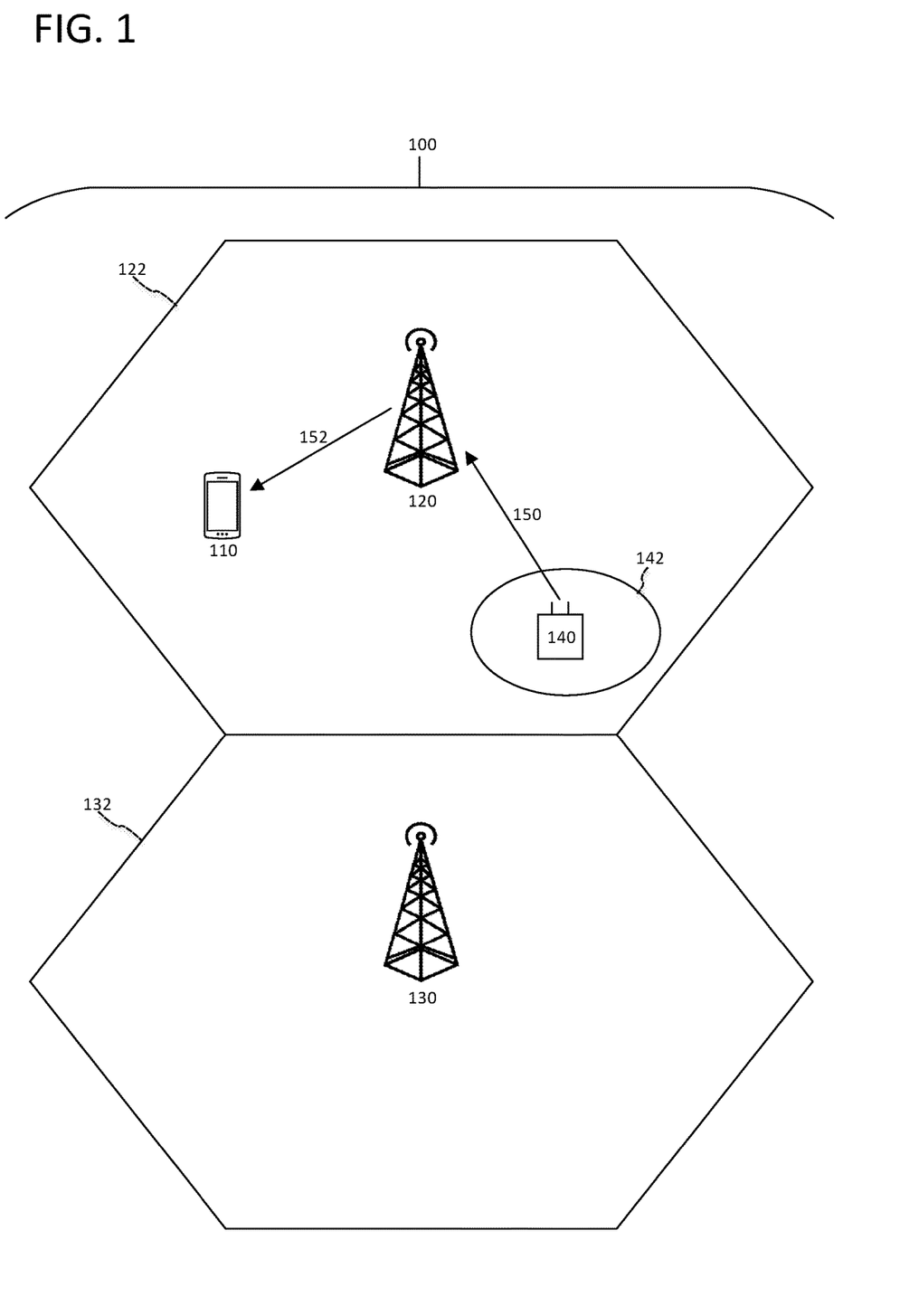
FIG. 1 shows network in an aspect of this disclosure

FIG. 1 shows a network 100 with UE 110, macro cell stations 120 and 130 with corresponding cells 122 and 132, and a low power station 140 (i.e. small cell station) with corresponding small cell 142, e.g. a Home eNodeB (H(e)NB) with corresponding CSG cell. Each of macro cell stations 120 and 130 may be LTE base stations (eNodeBs or eNBs) and serve cells 122 and 132, which may be sectorized, i.e. composed of multiple LTE cells. It is appreciated that while cells 122 and 132 (and small cell 142) are shown as having distinct boundaries, the coverage areas of each of the cells may overlap.

Small cell 142 may be a femtocell or a picocell, e.g. a closed subscriber group (CSG) cell, located within the coverage region 122 of base station 120. Low power station 140 is configured to provide small cell 142 with access to network 100. In the case small cell 142 is a CSG cell, its CSG ID may be provided to the CSG whitelist of UE 110 in order to provide access to the CSG cell.

This invention proposes a method for the network 100 to provide a location information of a small cell 142, e.g. CSG cell, to the UE 110 which can be used to derive the UE's proximity to a member CSG cell. Macro cell stations 120 and 130 may serve as an interface between the network 100 and UE 110.

If the small cell 142 is used for Home deployment for indoor coverage/capacity extension or for a small enterprise (e.g. coffee shop, hotel, etc.), the operator of the network 100 knows the address of the contractor and can infer the possible deployment location of the small cell station 140 (e.g. Home NodeB (HNB) of Home eNodeB (HeNB)) based on already available information. This estimated deployment location can be provided by downlink 152 as an initial location information to assist the UE 110.

In addition, in the case where small cell 142 is a CSG cell, at least one of the CSG cell's 142 IP address, its operating frequency, and/or surrounding macro cells of the CSG cell (e.g. 122 and possibly 132 as well) may be provided by the CSG cell 142 to the Universal Integrated Circuit Card (UICC) (i.e. Hosting Party Subscription Identity Module (HPSIM)) in the HeNB using the proactive Provide Local Information mechanism specified in 3GPP TS 31.111 v13.0.0 and 3GPP TS 31.104 v12.1.0. This information will be reported to or retrieved by the operator/macro network, e.g. by a nearby macro cell station, 150. The network can then use this information to enhance the accuracy of the already provided initial location information to update the UE along with CSG membership data in the UE's CSG whitelist.

If the UE has membership to one or more CSG cells, the network 100 will provide the appropriate CSD IDs and public land mobile network (PLMN) list update in the UE's CSG white list in downlink 152. Furthermore, in an aspect of this disclosure, the network 100 will provide (e.g. through a macro base station such as 120) the CSG location assistance data. This assistance data may include, for each CSG ID and PLMN, at least one of a list of location information for each CSG cell, CSG operating frequencies, and/or a list of surrounding macro cells.

The elementary files required to provide CSG location information and procedures between the HeNB (i.e. small cell station) and the HPSIM (i.e. SIM card of the small cell station) are defined in 3GPP TS 31.111 v13.0.0 and 3GPP TS 31.104 v12.1.0. The elementary files are the files that hold data, from which a software may display these files in a similar manner to a computer displaying the contents of its hard drive. In one aspect of this disclosure, the network 100 may use these elementary files (or other such elementary files) to provide the UE 110 with the CSG assistance data in downlink 152.

In another aspect of this disclosure, the network 100 may use new elementary files to pass the CSG assistance data (i.e. CSG cell's location information) in downlink 152.

Once the UE 110 receives the CSG assistance data in downlink 152 from the network 100 (e.g. via a macro base station 120), the UE 110 may use this acquired data to configure the background CSG search only in the proximity of a member CSG cell. The UE 110 may be configured to receive the data in downlink 152 from the network and perform the background search only when it is in proximity of a CSG cell (e.g. 142) or within a surrounding macro cell as provided by the network (e.g. within 122 or 124, or within a certain range of both 122 and 124). By doing so, the UE 110 is able to avoid unnecessary searches, thereby conserving power. Furthermore, UE 110 may be configured to optionally increase or decrease the search rate based on the mobility to and from the CSG cell, and thereby, reducing the time to select the target CSG cell.

In an aspect of this disclosure, methods and devices are disclosed for a network to provide a location information of a CSG cell to a UE which can be used to derive the UE's proximity to a CSG cell. The following explanation references FIG. 1 with respect to small cell 142 being a CSG cell, but it appreciated that the ensuing disclosure encompasses related technologies as well.

The network 100 may collect the operating frequencies of the CSG cell 142 [i.e. the EUTRA Absolute radio-frequency channel number (EARFCN) or UTRA Absolute Radio Frequency Channel Number (UARFCN)] in communication 150 (through base station 120). The operating frequencies are updated in the UICC of the HeNB/HNB 140. This may be done by using the PROVIDE LOCAL INFORMATION mechanism specified in 3GPP TS 31.111 v13.0.0 and may be retrieved by the network 150 or provided by the HeNB/HNB 140 in 150. Based on this information, the network 100 may build a database containing a list of frequencies used by the CSG cells belonging to a CSG ID. Such a database may include information collected from each CSG ID the network operator has defined and provided services for.

Furthermore, the network 100 (via base station 120) may retrieve the IP addresses of the surrounding macro cells from the UICC in HeNB/HNB 140.

In another aspect of this disclosure, the network may also determine the approximate location of the HNB/HeNB 140 according to one of the following examples.

In a first example, the HNB/HeNB 140 location may be determined based on surrounding neighbor cells' (e.g. at least cells 122 and 132) reception power level reported by the HNB/HeNB 140. The network may be able to determine the location of the HeNB/HNB 140 by triangulation if the exact location and transmit power levels of the surrounding macro cell stations (e.g. stations 120 and 130) are known.

In another example, the HeNB/HNB 130 can report its location through a Geographical Location Reporting functionality if the HeNB/HNB has a Global Navigation Satellite System (GNSS) capability or by obtaining the location information from the UE using Radio Resource Control (RRC) measurement reports, e.g. used in Minimization of Drive Tests (MDTs).

Once the network 100 has collected the CSG location information and other assistance data 150 via macro cell station 120, for example, it may provide the UE 110 with the CSG location information and other assistance data 152. For example, whenever UE's 110 membership for a particular CSG cell is added to the CSG whitelist and/or whenever the CSG whitelist is updated, the network may also provide, for each CSG ID and PLMN combination, at least one of the following: a list of location information of the HeNB/HNB; a list of CSG operating frequencies belonging to each respective CSG cell; and/or a list of surrounding macro cells reported by the HeNB/HNB.

By using this information provided by the network, the UE may be configured to perform a background CSG search only in the proximity of a member CSG cell. By doing so, may avoid unnecessary CSG searches, thereby conserving power.

In one aspect of this disclosure, the UE is configured to trigger a background CSG search when the UE is camped on any of the macro cells on the lists of surrounding macro cells reported by the HeNB/HNB. The UE may be further configured to limit the background CSG search to a frequency on the list of operating frequencies on the respective Radio Access Technology (RAT).

In another aspect of this disclosure, the UE may be configured to perform the background CSG search only when the UE is in proximity of a member CSG cell as reported to the UE by the network. Depending on the mobility to and from the CSH cell, the UE may be further configured to increase or decrease the search rate.

In another aspect of this disclosure, the UE may be configured to perform both of the immediately aforementioned aspects.

Figure 2:
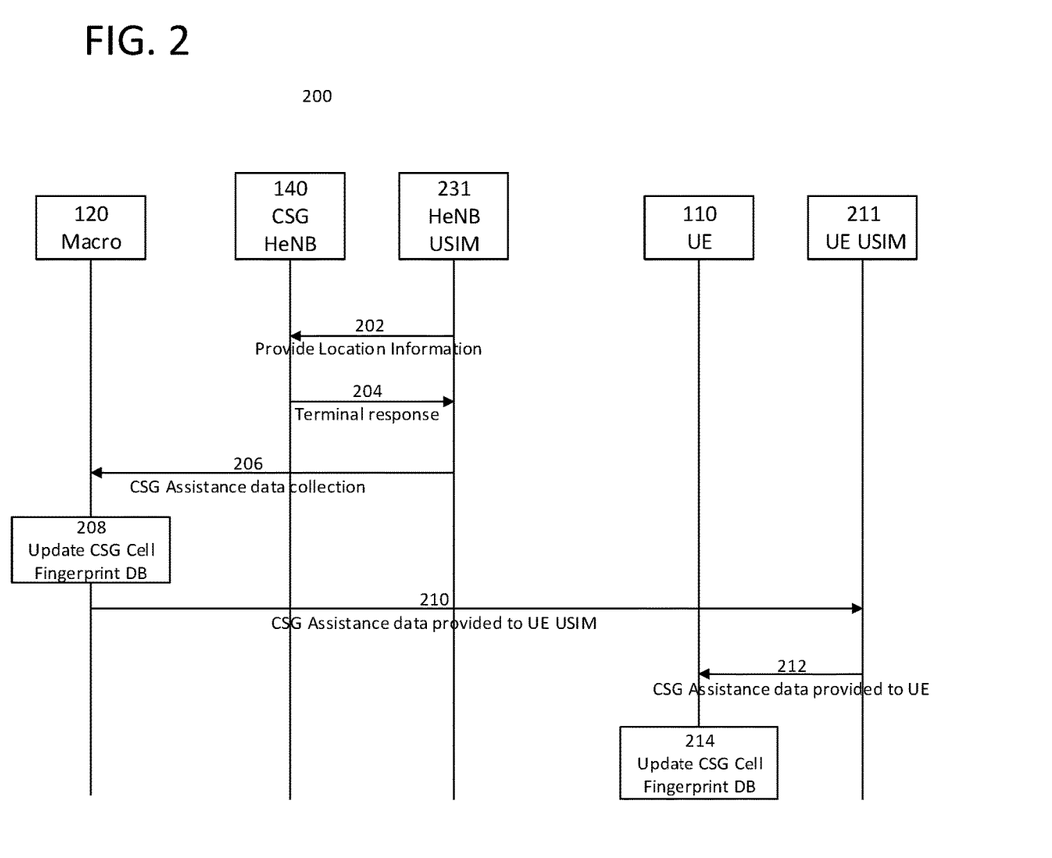
FIG. 2 shows a message sequence chart (MSC) in an aspect of this disclosure.

FIG. 2 shows a message sequence chart (MSC) 200 in an aspect of this disclosure. It is appreciated that MSC 200 is exemplary in nature and may therefore be simplified for purposes of this explanation.

MSC 200 is explained in terms of the small cell base station being a HeNB, but it is appreciated that the ensuing disclosure applies to any similar technologies.

In 202, the HeNB USIM 231 triggers a location collection from the CSG HeNB 140, for example, by collecting the location from the HeNB by triggering the necessary collection procedure via PROVIDE LOCAL INFORMATION mechanism.

This location information may include macro cells (and their IP addresses) which surround the HeNB. This information may be obtained using the mechanism specified in 3GPP TS 31.111 v13.0.0, sec 5.2, 6.4.15, 6.8.7, 8.6, Annex A (optional functionalities letter Class v and Letter Class w). This location information may include either or both of the following aspects.

In a first aspect, this location information may include the location of the HeNB. This location information may be obtained based on the surrounding neighboring cells' reception power level reported by the HeNB. By using these HeNB reception power levels, the location of the HeNB may be determined by triangulation if the location of the surrounding cell base stations and transmit power levels are known.

In a second aspect, this location information may include the HeNB obtaining its location through Geographical Location Reporting if the HeNB has GNSS capability and reporting it to the network. Alternatively, the network may obtain the location information from the UE when the UE is served by the HeNB (i.e. the UE is within coverage of the HeNB) using the RRC measurement report method used in Immediate MDT.

The CSG HeNB 140 provides a terminal response 204 to the location information request, which includes the location information to the HeNB USIM 231. The HeNB USIM 231 then provides the network, e.g. through the closest Macro Cell Station 120, with the CSG Assistance data collection information 206. This CSG Assistance data collection information may include the aforementioned location information and may further include the operating frequency(ies) of the CSG HeNB, i.e. EARFCN (UARFCN in the case of 3G HNB). The macro cell station 120 then updates the network's CSG Cell Fingerprint Database (DB) 208.

Once the CSG Cell Fingerprint DB has been updated, the network, through macro cell station 120, may provide the UE USIM 211 of with the CSG Assistance data 210. It is appreciated that any one of the macro cell stations of the network may provide the USIM of the UE with the updated CSG Assistance data. For example, referring to FIG. 1, macro cell station 120 may receive the CSG Assistance data from HeNB 140, and update the network's CSG Fingerprint DB. Then, macro cell station 130, of the same network, may provide a USIM of a UE within its cell 132 with this updated CSG Assistance data.

After the UE USIM 211 receives the CSG Assistance data from a macro cell station of the network (in this case, macro cell station 120), the CSG Assistance data is sent to the UE 110 in 212 so that the UE can update its CSG Cell Fingerprint DB 214. The UE may perform this update when it updates its CSG whitelist. In this manner, the UE may maintain up to date information about the location of the CSG cells to which it belongs in order to efficiently implement the background searches detailed herein.

Figure 3:
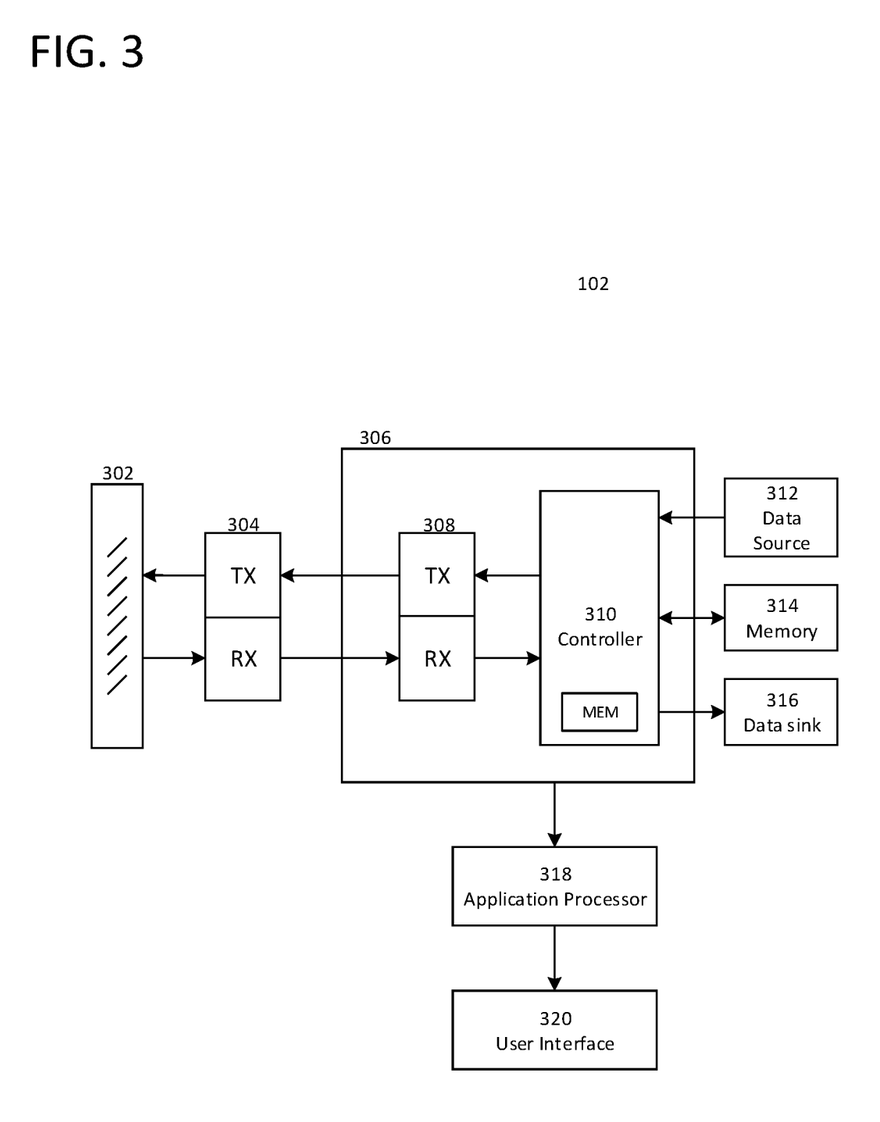
FIG. 3 shows an internal configuration of a communication device in an aspect of this disclosure.

FIG. 3 shows an internal configuration of communication device, e.g. UE 102, which may be configured to perform the joint time and frequency offset estimation procedure of this disclosure. As shown in FIG. 3, UE 102 may include antenna system 302, radio frequency (RF) transceiver 304, baseband modem 306 (including physical layer processing circuit 308 and controller 310), data source 312, memory 314, and data sink 316. Although not explicitly shown in FIG. 3, UE 102 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, UE 102 may transmit and receive radio signals on one or more radio access networks. Baseband modem 306 may direct such communication functionality of UE 102 according to the communication protocols associated with each radio access network, and may execute control over antenna system 302 and RF transceiver 304 in order to transmit and receive radio signals according to the formatting and scheduling parameters defined by each communication protocol.

UE 102 may transmit and receive radio signals with antenna system 302, which may be a single antenna or an antenna array composed of multiple antennas and may additionally include analog antenna combination and/or beamforming circuitry. In the receive path (RX), RF transceiver 304 may receive analog radio frequency signals from antenna system 302 and perform analog and digital RF front-end processing on the analog radio frequency signals to produce digital baseband samples (e.g. In-Phase/Quadrature (IQ) samples) to provide to baseband modem 306. RF transceiver 304 may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 304 may receive digital baseband samples from baseband modem 306 and perform analog and digital RF front-end processing on the digital baseband samples to produce analog radio frequency signals to provide to antenna system 302 for wireless transmission. RF transceiver 304 may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 306 to produce the analog radio frequency signals for wireless transmission by antenna system 302. Baseband modem 306 may control the RF transmission and reception of RF transceiver 304, including specifying transmit and receive radio frequencies for operation of RF transceiver 304.

As shown in FIG. 3, baseband modem 306 may include physical layer processing circuit 308, which may perform physical layer (Layer 1) transmission and reception processing to prepare outgoing transmit data provided by controller 310 for transmission via RF transceiver 304 and prepare incoming received data provided by RF transceiver 304 for processing by controller 310. Physical layer processing circuit 308 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 308 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 3, physical layer processing circuit 308 may include a control circuit such as a processor configured to control the various hardware and software processing components of physical layer processing circuit 308 in accordance with physical layer control logic defined by the communications protocol for the relevant radio access technologies. Furthermore, while physical layer processing circuit 308 is depicted as a single component in FIG. 3, physical layer processing circuit 308 may be collectively composed separate sections of physical layer processing circuitry where each respective section is dedicated to the physical layer processing of a particular radio access technology.

UE 102 may be configured to operate according to one or more radio access technologies (RATs), which may be directed by controller 310. Controller 310 may thus be responsible for controlling the radio communication components of UE 102 (antenna system 302, RF transceiver 304, and physical layer processing circuit 308) in accordance with the communication protocols of each supported radio access technology, and accordingly may represent the Access Stratum and Non-Access Stratum (NAS) (also encompassing Layer 2 and Layer 3) of each supported radio access technology. Controller 310 may be structurally embodied as a protocol processor configured to execute protocol software (retrieved from controller memory MEM as shown in FIG. 3) and subsequently control the radio communication components of UE 102 in order to transmit and receive communication signals in accordance with the corresponding protocol control logic defined in the protocol software.

Controller 310 may therefore be configured to manage the radio communication functionality of UE 102 in order to communicate with the various radio and core network components of network 100, and accordingly may be configured according to the communication protocols for both the LTE network and the GSM/UMTS legacy network. Controller 310 may either be a unified controller that is collectively responsible for all supported radio access technologies (e.g. LTE and GSM/UMTS) or may be composed of multiple separate controllers where each controller is a dedicated controller for a particular radio access technology, such as e.g. a dedicated LTE controller and a dedicated legacy controller (or alternatively a dedicated LTE controller, dedicated GSM controller, and a dedicated UMTS controller). Regardless, controller 310 may be responsible for directing radio communication activity of UE 102 according to the communication protocols of the LTE and legacy networks. As previously noted regarding physical layer processing circuit 308, one or both of antenna system 302 and RF transceiver 304 may similarly be partitioned into multiple dedicated components that each respectively correspond to one or more of the supported radio access technologies. Depending on the specifics of each such configuration and the number of supported radio access technologies, controller 310 may be configured to control the radio communication operations of UE 102 in accordance with a master/slave RAT hierarchical or multi-SIM scheme.

UE 102 may further comprise data source 312, memory 314, and data sink 316, where data source 312 may include sources of communication data above controller 310 (i.e. above the NAS/Layer 3) and data sink 316 may include destinations of communication data above controller 310 (i.e. above the NAS/Layer 3). Such may include, for example, an application processor 318 of UE 102, which may be configured to execute various applications and/or programs of UE 102 at an application layer of UE 102, such as e.g. an Operating System (OS), a User Interface (UI) 320 for supporting user interaction with UE 102, and/or various user applications. The application processor 318 may interface with baseband modem 306 as an application layer to transmit and receive user data such as voice data, audio/video/image data, messaging data, application data, basic Internet/web access data, etc., over a the radio network connection(s) provided by baseband modem 306. Data source 312 and data sink 316 may additionally represent various user input/output devices of UE 102, such as display(s), keypad(s), touchscreen(s), speaker(s), external button(s), camera(s), microphone(s), etc., which may allow a user of UE 102 to control various communication functions of UE 102 associated with user data. For example, UI 320 may be specifically configured to provide a user with an interface by which to select a small cell detected by a cell triggered in an aspect of this disclosure.

Memory 314 may embody a memory component of UE 102, such as e.g. a hard drive or another such permanent memory device. Although not explicitly depicted in FIG. 3, the various other components of UE 102 shown in FIG. 4 may additionally each include integrated permanent and non-permanent memory components, such as for storing software program code, buffering data, etc.

Figure 4:
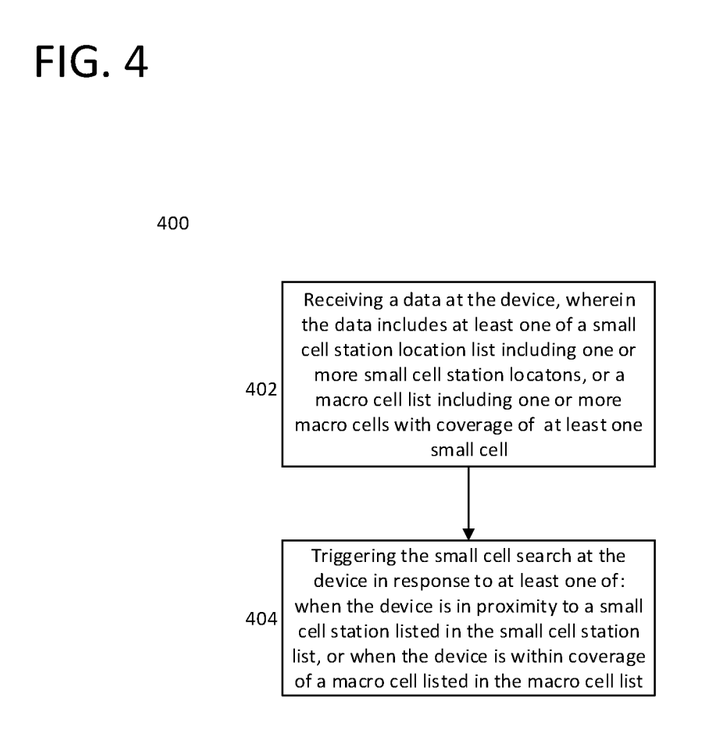
FIG. 4 shows a flowchart describing a process in an aspect of this disclosure.

The baseband modem 306 may be configured to implement any of the processes and methods described herein, e.g. the process described by FIG. 4 and its corresponding description.

FIG. 4 shows a flowchart 400 in an aspect of this disclosure. It is appreciated that flowchart 400 is exemplary in nature and may therefore be simplified for purposes of this explanation. Flowchart 400 shows a process by which a device may trigger a small cell search in order to connect to a small cell for the first time.

The device is configured to receive a data from the network, wherein the data includes at least one of a small cell station location list including one or more small cell station locations, or a macro cell list including one or more macro cells with coverage of at least one small cell 402. The device is configured to receive this data from the network even though the device may have not selected/connected to a small cell pertaining to the one or more small cell station locations on the first list, i.e. the next time the device connects to the small cell will be the first time.

After receiving the data from the network, the device is further configured to trigger the small cell search at the device in response to at least one of the following: when the device is in proximity to a small cell station location listed in the small cell station location list, or when the device is within a macro cell listed in the macro cell list 404.

In another aspect of this disclosure, the process described in FIG. 4 is the only manner by which a device may trigger a small cell search.

In another aspect of this disclosure, this process may complement an Autonomous CSG cell search by providing an efficient means to connect to a CSG cell for the first time (including when a CSG cell's parameters have changed so that the device no longer recognizes the CSG cell).

Although not explicitly shown in FIG. 4, in a further aspect of this disclosure, the search rate can be increased or decreased based on the mobility of the UE to and from the CSG cell, thereby improving the efficiency (i.e. the time) in selecting a target CSG cell. Furthermore, the search may be altered over a wider or narrower frequency range based on the data received at the UE, thereby providing for a more efficient search.

As used herein, connecting to a CSG cell for the first time may mean when a device selects and connects to a CSG cell for the first time or also if the device is connecting to a CSG cell after the CSG cell parameters have changed (e.g. CSG cell is shifted to a new geographic location, a new authorization code in order to access the CSG cell, etc.).

In Example 1, A method for a device to receive data in order to trigger a small cell search, the method including receiving data from a network, wherein the data comprises at least one of: a small cell station location list comprising one or more small cell station locations, or a macro cell list comprising one or more macro cells with coverage of at least one small cell; and triggering a small cell search at the device in response to at least one of the following: when the device is in proximity to a small cell station location listed in the small cell station list, or when the device is within coverage of a macro cell listed in the macro cell list.

In Example 2, the subject matter of Example 1 may include wherein the data further comprises a small cell operating frequency list comprising one or more small cell operating frequencies, wherein the small cell search comprises limiting the small cell search to at least one of the one or more small cell operating frequencies in the small cell operating frequency list.

In Example 3, the subject matter of Examples 1-2 may include initially collecting the data at one or more network sites.

In Example 4, the subject matter of Example 3 may include wherein at least one of the network sites transmits the data to the device.

In Example 5, the subject matter of Examples 3-4 may include wherein at least one of the network sites is a macro cell station.

In Example 6, the subject matter of Example 5 may include wherein the macro cell station is a home base station.

In Example 7, the subject matter of Examples 1-6 may include providing a user with an interface at the device to select a target small cell detected as a result of the small cell search.

In Example 8, the subject matter of Examples 1-7 may include wherein the target small cell is a restricted access cell.

In Example 9, the subject matter of Example 8 may include wherein the restricted access cell is a Closed Subscriber Group (CSG) cell.

In Example 10, the subject matter of Examples 7-9 may include wherein the target small cell is selected for the first time based on the data received from the network, the data comprising parameters of the target cell.

In Example 11, the subject matter of Example 10 may include wherein the parameters comprise at least one of a small cell identification, a public land mobile network (PLMN) number, or an operating frequency of the target small cell.

In Example 12, the subject matter of Examples 2-11 may include wherein at least one of the one or more operating frequencies is a EUTRA Absolute radio-frequency channel number (EARFCN) or an UTRA Absolute Radio Frequency Channel Number (UARFCN).

In Example 13, the subject matter of Examples 1-12 may include wherein the least one small cell operating frequency is associated with a specific small cell.

In Example 14, the subject matter of Examples 1-13 may include wherein the small cell station is a Home base station or Home small base station.

In Example 15, the subject matter of Examples 1-14 may include wherein the network determines the location of the at least one small cell station in the macro cell list based on surrounding neighbor cells' reception power levels reported by the small cell station.

In Example 16, the subject matter of Example 15 may include the network determining the location of the small cell station by a triangulation method.

In Example 17, the subject matter of Example 16 may include wherein the triangulation method comprises using the location of the surrounding neighbor cells' base stations and transmit power levels.

In Example 18, the subject matter of Examples 1-14 may include wherein the network determines the location of the at least one small cell station in the macro cell list based on the small cell station reporting its location to the network.

In Example 19, the subject matter of Example 18 may include wherein the small cell station determines its location through Geographical Location Reporting functionality by Global Navigation Satellite System capability.

In Example 20, the subject matter of Example 18 may include wherein the small cell station determines its location by using a Radio Resource Control measurement report procedure.

In Example 21, the subject matter of Examples 1-20 may include providing the data to the device with a CSG Whitelist update.

In Example 22, the subject matter of Examples 1-21 may include wherein the small cell search is triggered only upon the occurrence of at least one of the device is in proximity to a small cell station location listed in the small cell station location list or when the device is located within coverage of a macro cell listed in the macro cell list.

In Example 23, the subject matter of Examples 1-22 may include increasing or decreasing a rate of the triggering of the small cell search based upon a mobility of the device to or from a target small cell.

In Example 24, the subject matter of Examples 2-23 may include altering the small cell search based upon the small cell operating frequency in the small cell operating frequency list.

In Example 25, a method for a device to trigger a small cell search, comprising: collecting a data from a network, wherein the data includes at least one of: a small cell station location list comprising one or more small cell station locations, or a macro cell list comprising one or more macro cells with coverage of at least one small cell; triggering a small cell search at the device only when in proximity to a small cell station on the small cell station location list or within coverage of a macro cell on the macro cell list.

In Example 26, the subject matter of Example 25 may include wherein the data further comprises a small cell operating frequency list comprising one or more small cell operating frequencies, wherein the small cell search comprises limiting the small cell search to at least one of the one or more small cell operating frequencies in the small cell operating frequency list.

In Example 27, the subject matter of Examples 25-26 may include initially collecting the data at one or more network sites.

In Example 28, the subject matter of Example 27 may include wherein at least one of the network sites transmits the data to the device.

In Example 29, the subject matter of Examples 27-28 may include wherein at least one of the network sites is a macro cell station.

In Example 30, the subject matter of Example 29 may include wherein the macro cell station is a home base station.

In Example 31, the subject matter of Examples 25-30 may include providing a user with an interface at the device to select a target small cell detected as a result of the small cell search.

In Example 32, the subject matter of Examples 25-31 may include wherein the target small cell is a restricted access cell.

In Example 33, the subject matter of Example 32 may include wherein the restricted access cell is a Closed Subscriber Group (CSG) cell.

In Example 34, the subject matter of Examples 31-33 may include wherein the target small cell is selected for the first time based on the data received from the network, the data comprising parameters of the target cell.

In Example 35, the subject matter of Example 34 may include wherein the parameters comprise at least one of a small cell identification, a public land mobile network (PLMN) number, or an operating frequency of the target small cell.

In Example 36, the subject matter of Examples 26-35 may include wherein at least one of the one or more operating frequencies is a EUTRA Absolute radio-frequency channel number (EARFCN) or an UTRA Absolute Radio Frequency Channel Number (UARFCN).

In Example 37, the subject matter of Examples 26-36 may include wherein the least one small cell operating frequency is associated with a specific small cell.

In Example 38, the subject matter of Examples 25-37 may include wherein the small cell station is a Home base station or Home small base station.

In Example 39 the subject matter of Examples 25-38 may include wherein the network determines the location of the at least one small cell station in the macro cell list based on surrounding neighbor cells' reception power levels reported by the small cell station.

In Example 40, the subject matter of Example 39 may include the network determining the location of the small cell station by a triangulation method.

In Example 41, the subject matter of Example 40 may include wherein the triangulation method comprises using the location of the surrounding neighbor cells' base stations and transmit power levels.

In Example 42, the subject matter of Examples 25-38 may include wherein the network determines the location of the at least one small cell station in the macro cell list based on the small cell station reporting its location to the network.

In Example 43, the subject matter of Example 42 may include wherein the small cell station determines its location through Geographical Location Reporting functionality by Global Navigation Satellite System capability.

In Example 44, the subject matter of Example 42 may include wherein the small cell station determines its location by using a Radio Resource Control measurement report procedure.

In Example 45, the subject matter of Examples 25-44 may include providing the data to the device with a CSG Whitelist update.

In Example 46, the subject matter of Examples 25-45 may include adapting a rate of triggering the small cell search based on a mobility to or from the small cell.

In Example 47, the subject matter of Examples 25-46 may include increasing or decreasing a rate of the triggering of the small cell search based upon a mobility of the device to and/or from a target small cell.

In Example 48, the subject matter of Examples 26-47 may include altering the small cell search based upon one or more small cell operating frequencies in the small cell operating frequency list.

In Example 49, a communication device adapted to trigger a small cell search, including: a transceiver configured to receive a data from a network, wherein the data comprises at least one of: a small cell station location list comprising one or more small cell station locations, or a macro cell list comprising one or more macro cells with coverage of at least one small cell; and a baseband modem configured to trigger a small cell search at the device according to at least one of the following: when in proximity to a small cell station location listed in the small cell station list, or within coverage of a macro cell listed in the macro cell list.

In Example 50, the subject matter of Example 49 may include wherein the data further comprises a small cell operating frequency list with one or more small cell operating frequency, wherein the small cell search comprises limiting the small cell search to at least one of the one or more small cell operating frequencies in the small cell operating frequency list.

In Example 51, the subject matter of Examples 49-50 may include an interface configured to provide a user with the option of selecting a target small cell identified in the small cell search.

In Example 52, the subject matter of Examples 49-51 may include wherein the baseband modem triggers the small cell search only upon the occurrence of at least one of the device being in proximity to a small cell station location listed in the small cell station location list or when the device is within coverage of a macro cell listed in the macro cell list.

In Example 53, the subject matter of Examples 49-52 may include further comprising a user interface configured to allow a user to select a target small cell detected as a result of the small cell search.

In Example 54, the subject matter of Examples 49-53 may include wherein the target small cell is a restricted access cell.

In Example 55, the subject matter of Example 54 may include wherein the restricted access cell is a Closed Subscriber Group (CSG) cell.

In Example 56, the subject matter of Examples 49-55 may include wherein the transceiver is further configured to receive a CSG Whitelist update and provide the CSG Whitelist update to the baseband modem with the data.

In Example 57, the subject matter of Examples 49-56 may include may include wherein the baseband modem is configured to trigger the small cell search only upon the occurrence of at least one of the device being in proximity to a small cell station location listed in the small cell location list or when the device is located within coverage of a macro cell listed in the macro cell list.

In Example 58, the subject matter of Examples 49-57 may include the baseband modem further configured to increase or decrease a rate of the triggering of the small cell search based upon a mobility of the device to or from a target small cell.

In Example 59, the subject matter of Examples 49-58 may include the baseband modem further configured to alter the small cell search based upon the small cell operating frequency in the small cell operating frequency list.

In Example 60, a communications system configured to provide one or more User Equipment (UE) with a data to trigger a small cell search, including one or more base stations configured to receive the data from at least one small cell station and transmit the data to the one or more UEs, the data including: a small cell station location list comprising one or more small cell station locations, or a macro cell list comprising one or more macro cells with coverage of at least one small cell; and the one or more UEs configured to receive the data from the one or more base stations and trigger a small search in response to at least one of the following: when in proximity to a small cell station location listed in the small cell station list, or within coverage of a macro cell listed in the macro cell list.

In Example 61, the subject matter of Example 60 may include wherein the data further comprises a small cell operating frequency list comprising one or more small cell operating frequencies, wherein the small cell search comprises limiting the small cell search to the one or more small cell operating frequencies in the small cell operating frequency list.

In Example 62, the subject matter of Examples 60-61 may include initially collecting the data at one or more network sites.

In Example 63, the subject matter of Example 62 may include wherein at least one of the network sites transmits the data to the device.

In Example 64, the subject matter of Examples 62-63 may include wherein at least one of the network sites is a macro cell station.

In Example 65, the subject matter of Example 64 may include wherein the macro cell station is a home base station.

In Example 66, the subject matter of Examples 60-65 may include providing a user with an interface at the device to select a target small cell detected as a result of the small cell search.

In Example 67, the subject matter of Examples 60-66 may include wherein the target small cell is a restricted access cell.

In Example 68, the subject matter of Example 67 may include wherein the restricted access cell is a Closed Subscriber Group (CSG) cell.

In Example 69, the subject matter of Examples 66-68 may include wherein the target small cell is selected for the first time based on the data received from the network, the data comprising parameters of the target cell.

In Example 70, the subject matter of Example 69 may include wherein the parameters comprise at least one of a small cell identification, a public land mobile network (PLMN) number, or an operating frequency of the target small cell.

In Example 71, the subject matter of Examples 61-70 may include wherein at least one of the one or more operating frequencies is a EUTRA Absolute radio-frequency channel number (EARFCN) or an UTRA Absolute Radio Frequency Channel Number (UARFCN).

In Example 72, the subject matter of Examples 61-71 may include wherein the least one small cell operating frequency is associated with a specific small cell.

In Example 73, the subject matter of Examples 60-72 may include wherein the small cell station is a Home base station or Home small base station.

In Example 74, the subject matter of Examples 60-73 may include wherein the network determines the location of the at least one small cell station in the macro cell list based on surrounding neighbor cells' reception power levels reported by the small cell station.

In Example 75, the subject matter of Example 74 may include the network determining the location of the small cell station by a triangulation method.

In Example 76, the subject matter of Example 75 may include wherein the triangulation method comprises using the location of the surrounding neighbor cells' base stations and transmit power levels.

In Example 77, the subject matter of Examples 60-76 may include wherein the network determines the location of the at least one small cell station in the macro cell list based on the small cell station reporting its location to the network.

In Example 78, the subject matter of Example 77 may include wherein the small cell station determines its location through Geographical Location Reporting functionality by Global Navigation Satellite System capability.

In Example 79, the subject matter of Example 77 may include wherein the small cell station determines its location by using a Radio Resource Control measurement report procedure.

In Example 80, the subject matter of Examples 60-79 may include providing the data to the device with a CSG Whitelist update.

In Example 81, the subject matter of Examples 60-80 may include adapting a rate of the triggering of the small cell search based on a mobility to or from the small cell.

In Example 82, the subject matter of Examples 60-81 may include wherein a UE of the one or more UEs triggers the small cell search only when the UE is in proximity to a small cell station location listed in the small cell station location list or when the UE is within coverage of a macro cell listed in the macro cell list.

In Example 83, the subject matter of Examples 60-82 may include increasing or decreasing the triggering of the small cell search based upon a mobility of the device to and/or from a target small cell.

In Example 84, the subject matter of Examples 61-83 may include altering the small cell search based upon the small cell operating frequency in the small cell operating frequency list.

In Example 85, a computer readable medium with program instructions when executed cause a processor of a device to cause the device to perform the method or realize a device of any of the preceding claims. The computer readable medium may be a non-transitory computer readable medium.

In Example 86, an apparatus comprising means to perform a method as claimed in any one of claims 1-48.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for a device to receive data in order to trigger a small cell search, the method comprising:
   receiving data from a network, wherein the data comprises at least one of:
      a small cell station location list comprising one or more small cell station locations, or
      a macro cell list comprising one or more macro cells with coverage of at least one small cell;
   triggering a small cell search at the device in response to at least one of the following:
      when the device is in proximity to a small cell station location listed in the small cell station list, or
      when the device is within coverage of a macro cell listed in the macro cell list; and
   increasing or decreasing a rate of the triggering of the small cell search based upon a mobility of the device to or from a target small cell.

2. The method of claim 1, wherein the data further comprises a small cell operating frequency list comprising one or more small cell operating frequencies, wherein the small cell search comprises limiting the small cell search to at least one of the one or more small cell operating frequencies in the small cell operating frequency list.

3. The method of claim 1, further comprising initially collecting the data at one or more network sites.

4. The method of claim 1, further comprising providing a user with an interface at the device and providing a notification, via the interface, that a target small cell detected as a result of the small cell search is available for selection.

5. The method of claim 4, wherein the target small cell is a restricted access cell.

6. The method of claim 5, wherein the restricted access cell is a Closed Subscriber Group (CSG) cell.

7. The method of claim 4, wherein the target small cell is selected for the first time based on the data received from the network, the data comprising parameters of the target small cell.

8. The method of claim 7, wherein the parameters comprise at least one of a small cell identification, a public land mobile network (PLMN) number, or an operating frequency of the target small cell.

9. The method of claim 1, wherein the small cell search is triggered only upon the occurrence of at least one of when the device is in proximity to a small cell station location listed in the small cell station location list or when the device is located within coverage of a macro cell listed in the macro cell list.

10. The method of claim 2, further comprising altering the small cell search based upon the small cell operating frequency in the small cell operating frequency list.

11. The method of claim 1, wherein the network determines the location of the at least one small cell station in the macro cell list based on surrounding neighbor cells' reception power levels reported by the small cell station.

12. The method of claim 11, further comprising the network determining the location of the small cell station by a triangulation method.

13. The method of claim 12, wherein the triangulation method comprises using the location of the surrounding neighbor cells' base stations and transmit power levels.

14. The method of claim 1, wherein the network determines the location of the at least one small cell station in the macro cell list based on the small cell station reporting its location to the network.

15. The method of claim 14, wherein the small cell station determines its location through Geographical Location Reporting functionality by Global Navigation Satellite System capability.

16. The method of claim 15, wherein the small cell station determines its location by using a Radio Resource Control measurement report procedure.

17. A communication device adapted to trigger a small cell search, comprising one or more processors configured to:
   obtain data from a network, wherein the data comprises at least one of:
      a small cell station location list comprising one or more small cell station locations, or
      a macro cell list comprising one or more macro cells with coverage of at least one small cell;
   trigger a small cell search according to at least one of the following:
      when in proximity to a small cell station location listed in the small cell station list, or
      within coverage of a macro cell listed in the macro cell list; and
   increase or decrease a rate of the triggering of the small cell search based upon a mobility of the communication device to or from a target small cell.

18. The communication device of claim 17, wherein the data further comprises a small cell operating frequency list with one or more small cell operating frequency, wherein the small cell search comprises limiting the small cell search to at least one of the one or more small cell operating frequencies in the small cell operating frequency list.

19. The communication device of claim 17, wherein the one or more processors trigger the small cell search only upon the occurrence of at least one of when the device in proximity to a small cell station location listed in the small cell station location list or when the device is within coverage of a macro cell listed in the macro cell list.

20. The communication device of claim 17, the one or more processors further configured to alter the small cell search based upon the small cell operating frequency in the small cell operating frequency list.

21. A non-transitory computer readable medium including programmable instructions which when executed by a processor of a device cause the device to receive data in order to trigger a small cell search, comprising:
   receiving data from a network, wherein the data comprises at least one of:
      a small cell station location list comprising one or more small cell station locations, or
      a macro cell list comprising one or more macro cells with coverage of at least one small cell;
   triggering a small cell search at the device in response to at least one of the following:
      when the device is in proximity to a small cell station location listed in the small cell station list, or
      when the device is within coverage of a macro cell listed in the macro cell list;
   wherein the triggering of the small cell search is based only upon when the device is in proximity to a small cell station location listed in the small cell station location list or when the device is located within coverage of a macro cell listed in the macro cell list.

22. The non-transitory computer readable medium of claim 21, wherein the small cell search further comprises increasing or decreasing a rate of the triggering of the small cell search based upon a mobility of the device to or from a target small cell.

* * * * *